United States Patent

Munjat et al.

[11] 3,869,343
[45] Mar. 4, 1975

[54] CATIONIC THERMOSETTING RESIN FOR IMPROVING WET STRENGTH OF PAPER

[75] Inventors: Francis S. Munjat, Philadelphia; Samuel Ho Kim, Haverford, both of Pa.

[73] Assignee: E.F. Houghton and Company, Philadelphia, Pa.

[22] Filed: June 7, 1973

[21] Appl. No.: 367,802

[52] U.S. Cl............ 162/164, 260/78 SC, 260/78 A, 260/78 L, 260/78 TF
[51] Int. Cl........................ D21h 3/58, C08g 20/20
[58] Field of Search......... 162/164, 168; 260/78 SC, 260/78 A, 78 L, 78 TF

[56] References Cited
UNITED STATES PATENTS

| | | | |
|---|---|---|---|
| 3,250,664 | 5/1966 | Conte et al. | 162/164 |
| 3,320,215 | 5/1967 | Conte et al. | 162/168 |
| 3,395,130 | 7/1968 | McDowell et al. | 162/164 |
| 3,640,841 | 2/1972 | Winslow et al. | 162/164 |
| 3,761,350 | 9/1973 | Munjat et al. | 162/164 |

OTHER PUBLICATIONS

Morrison, R. T. and Boyd, R. N., "Organic Chemistry," Sec. Ed., Allyn & Bacon, Inc., Boston, Mass., 1966, p. 1129.

Primary Examiner—S. Leon Bashore
Assistant Examiner—William F. Smith
Attorney, Agent, or Firm—Howson and Howson

[57] ABSTRACT

Cationic thermosetting resins useful in imparting wet and dry strength to paper are prepared by reacting a heterocyclic dicarboxylic acid of the formula:

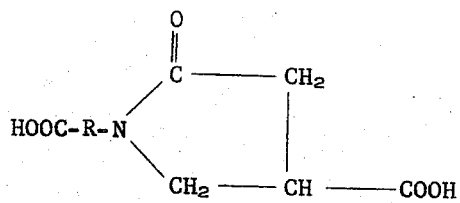

where R is alkylene or arylene with a diamine or polyalkylene polyamine, and itaconic acid to form a water-soluble polyamine polyamide polymer containing a plurality of spaced pyrrolidone groups, and then reacting said polymer with epichlorohydrin. An amino carbonyl compound may be included as a fourth reactant in forming the water-soluble polyamine polyamide polymer.

10 Claims, No Drawings

CATIONIC THERMOSETTING RESIN FOR IMPROVING WET STRENGTH OF PAPER

During the past two decades, a large number of different resins have been proposed for use in providing paper with improved wet strength. The greater portion of such resins have been various types of polyamides rendered thermosetting by means of crosslinking agents such as halohydrins. An advantage of these resins resides in the fact that they are pH independent, and thus can be applied to paper stock under alkaline, neutral or acid conditions.

An important property of any wet strength resin is the ability to provide paper with sufficient wet strength "off the machine", i.e., simply dried as it emerges from the wet end of a typical Fourdrinier paper machine and rolled up. Aging at room temperature allows additional curing of the resin and provides increased wet strength. Accelerated cure may be effected in systems which contain suitable drying sections.

Many of the various wet strength resins disclosed in the patent art provide inadequate off the machine wet strength, and in many instances insufficient wet strength after cure.

Those resins which give adequate wet strength properties with economically feasible amounts of resin generally do not provide adequate dry strength improvement to the paper. This latter property is also of importance to the paper maker.

In accordance with this invention, there are provided novel cationic thermosetting resins which provide paper with excellent wet strength, both off the machine and cured and also provide additional dry strength to the paper. In use these resins were found to produce decreased foaming in the paper machine and tissue of improved softness.

More particularly, the cationic thermosetting resins of this invention are prepared by reacting:

a. a heterocyclic dicarboxylic acid of the formula:

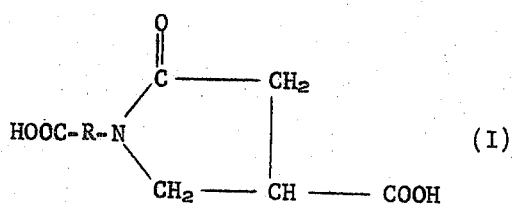

(I)

where R is an alkylene radical containing from 1 to 10 carbon atoms or an arylene radical, and for each mol of dicarboxylic acid, b. from 0 to 4 mols of an amino carbonyl compound which is an amino acid of the formula:

$$H_2N—R' — COOH \quad \text{II.}$$

or a lactam of the formula:

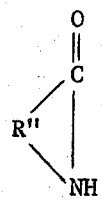

(III)

where R' is an alkylene radical containing from 1 to 10 carbon atoms or an arylene radical and R'' is an alkylene radical containing from 3 to 10 carbon atoms;

c. from 1 to 3 mols of an amine which is a diamine of the formula:

$$H_2N—R'''—NH_2 \quad \text{IV.}$$

or a polyalkylene polyamine of the formula:

$$H_2n—(R^{iv}—NH)_n—H \quad \text{V.}$$

where R''' and $R^{iv}$ are alkylene groups containing from 2 to 6 carbon atoms, and n is an integer from 1 to 5; and d. from 1 to 2 mols of itaconic acid to form a water soluble polyamine polyamide polymer, and then reacting said polymer with epichlorohydrin to produce a thermosetting resin.

The water soluble polyamine polyamide polymer has the following repeating structure:

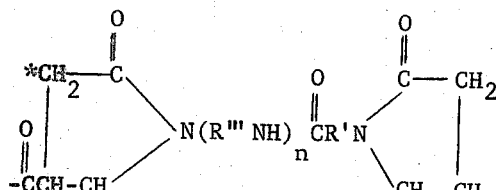 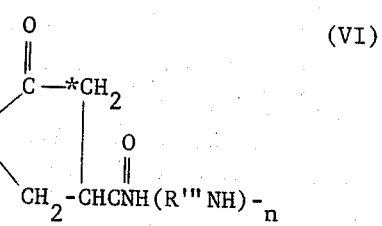

(VI)

z is 0 to 4, and R, R', R'', R''', $R^{iv}$ and n are as defined above.

The pyrrolidone groups (asterisks) are generated by providing an excess of itaconic acid to amine and holding the reaction temperature low to allow the addition to the double bond to take place followed by cyclization.

A preferred resin is obtained by reacting 1-carboxypentyl-4-carboxypyrrolidine, caprolactam, diethylene triamine, and itaconic acid to form the water soluble polyamine polyamide polymer which is subsequently rendered cross-linkable by reaction with epichlorohydrin.

Of particular importance in the novel improved wet strength resins of this invention is the presence of a large number of spaced pyrrolidone groups, see formula VI above, for it is believed the improved properties of the resin, e.g. strength and toughness, are attributable to the presence of such groups.

The unsymmetrical heterocyclic dicarboxylic acid reactant (a) may be prepared by reacting itaconic acid with an amino acid of formula (II) or a lactam of formula (III) in substantially equimolar proportions. The reaction may be carried out in aqueous solution; however, the amount of water used should be adjusted to provide suitable reaction conditions to produce the product desired. Thus, although the aqueous solution of reactants may contain up to about 50% by weight of water, subsequent concentration by distillation may reduce the reaction solution to 5 to 10% of water. The reactants are merely mixed with water in the stated proportions, solubilized by heating at 105° to about 130°C. for a period of from about 2 to 5 hours. In the case of the amino acids, concentration of the reacting solution can begin immediately after solubilization; with lactams, sufficient time must be given to accomplish hydrolysis to amino acid. Initially, there is formed an intermediate tricarboxylic acid by addition of the itaconic acid methylene double bond to the amino group of the amino acid. The solution is then concentrated to form the heterocyclic dicarboxylic acid.

The reaction mechanism involved in forming one of the preferred heterocyclic dicarboxylic acids, namely 1-(p-carboxyphenyl)-4-carboxypyrrolidone, may be illustrated by the following equations wherein itaconic acid and p-amino-benzoic acid are the reactants. The dicarboxylic acid separates from the reaction media and is isolated as a crystalline material.

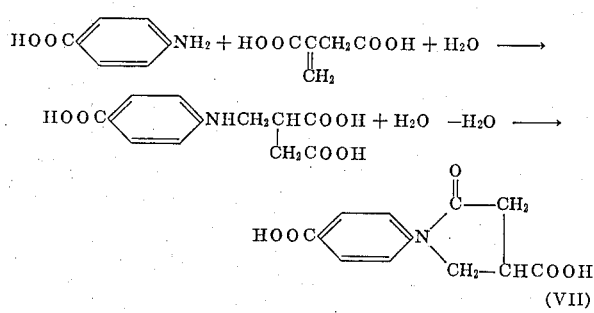

(VII)

This heterocyclic dicarboxylic acid is identified by melting point (277°–287°C.), acid number (435), and an analysis of significant bands in an infrared spectrum.

This same reaction procedure utilizing aliphatic amino acids results in highly viscous solutions of the discarboxylic acid at room temperature.

The same amino carbonyl compounds employed in forming the heterocyclic dicarboxylic acid may also be used in forming the water soluble polyamine polyamide polymer. However, in any particular polymer, the same or a different amino carbonyl compound may be used in forming the polymer as was employed in forming the heterocyclic acid.

As noted, the amino acids which may be used have the formula:

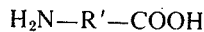

where R' is an alkylene radical containing from 1 to 10 carbon atoms or an arylene radical. The alkylene radical may be a straight or branched chain aliphatic group. Preferably, where R' is an alkylene radical, the amino acids are alpha-substituted amino acids such as alanine, leucine, valine, and alpha-amino butyric acid. Other suitable amino acids include glycine, beta-alanine, 4-amino butyric acid, 6-amino-caproic acid, and 11-amino undecanoic acid.

Aromatic amino acids which have been found useful in preparing the novel cationic thermosetting resins of the invention may contain such radicals as phenylene, naphthylene, etc., and alkyl substituted forms thereof. The amino groups may be directly substituted on the aromatic nucleus, or it may be on a terminal carbon atom of an alkyl group of 1 to 7 carbon atoms substituted on the aromatic ring. Similarly, the carboxylic acid group may be directly substituted on the aromatic ring or on a terminal carbon atom of an alkyl group containing from 1 to 7 carbon atoms substituted on the aromatic ring. Water solubility of the final resin characterizes the useful amino and carboxyl group containing compounds. Typical of useful aromatic amino carboxylic acids are o, m, and p-amino benzoic acid, p-(2-amino-ethyl) benzoic acid and p-aminophenylacetic acid.

Lactams which are suitable for use in preparing the resins of this invention have the formula:

(III)

where R'' is an alkylene radical containing from 3 to 10 carbon atoms. Thus, useful lactams include pyrrolidone, e-caprolactam and the like, the latter lactam being particularly preferred.

In addition to the heterocyclic dicarboxylic acid and amino carbonyl compound, certain amines are also employed in combination therewith in preparing the water soluble polyamine polyamide polymers. As stated above, the amines may be certain alkylene diamines of formula (IV) or certain polyalkylene polyamines of formula (V).

In the diamines, the primary amine groups are separated by an alkylene radical containing from 2 to 6 carbon atoms. Thus, suitable diamines include ethylene, propylene, butylene, pentylene, and hexylene diamine. Ethylene and propylene diamine are particularly preferred diamines inasmuch as they are somewhat more economical than the higher diamines.

A variety of polyalkylene polyamines including polyethylene polyamines, polypropylene polyamines, polybutylene polyamines, and the like can be employed to produce the polyamide, of which the polyethylenepolyamines represent an economically preferred class. More specifically, the polyalkylene polyamines employed are polyamines containing two primary amine groups, and at least one secondary amine group in which the nitrogen atoms are linked together by alkylene groups containing from 2 to 6 carbon atoms. The nitrogen atoms may be attached to adjacent carbon atoms in the ethylene groups or to carbon atoms futher apart, but not to the same carbon atom. Polyamines such as diethylene triamine, triethylenetetramine, tetraethylenepentamine, dipropylenetriamine, and the like, which can be obtained in reasonably pure form can be used as well as mixtures thereof and mixtures of various crude polyamine materials. For example, the mixture of polyethylenepolyamines obtained by the reaction of ammonia and ethylenedichlorides, refined only to the extent of removal of chlorides, water and excess ammonia, can be employed in the reaction with the dicarboxylic acid.

Most preferred are the polyethylene polyamines containing from two to four ethylene groups, two primary amine groups, and from one to three secondary amine groups.

The term "polyalkylene polyamine" employed in this specification and the claims, therefore, refers to and includes any of the polyalkylene polyamines referred to above and to mixtures thereof.

Rather than using solely a diamine or a polyalkylene polyamine, mixtures of the two types of amines, e.g., a mixture of ethylenediamine and diethylenetriamine may also be used.

utes. During such heating, the components react to form short chain amide compounds of formula VIII, below, and water of condensation which is utilized in the next step.

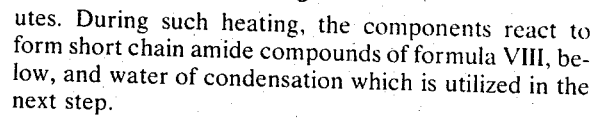
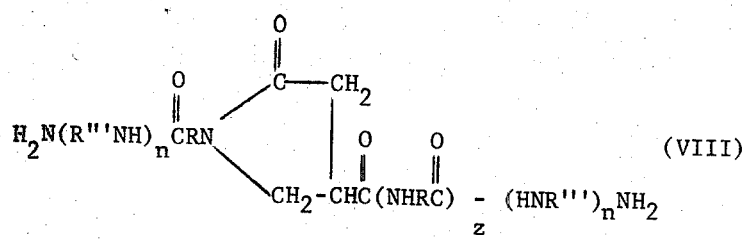

The remaining reactant is producing the water soluble polyamine polyamide polymers is itaconic acid. This reactant functions to generate additional pyrrolidone groups by reaction with amine groups at relatively low reaction temperatures.

The proportions of the reactants described above in

In formula VIII, R, R', R''', $n$ and $z$ are as set forth above.

The intermediate reaction product (VIII) with added water is cooled, and an excess of itaconic acid is added with respect to carboxyl groups to amine, to obtain a further intermediate of the formula:

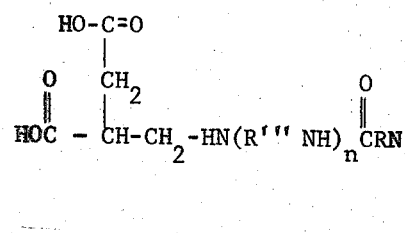
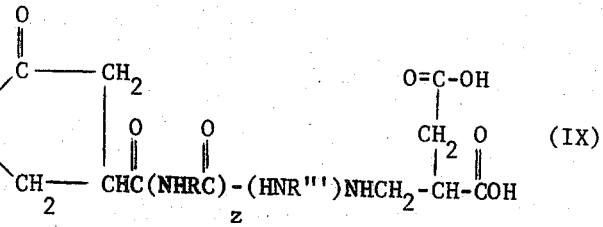

providing the improved resins is quite important. It was found that the mol ratios of reactants: (a) heterocyclic dicarboxylic acid, (b) amino carbonyl compound, (c) diamine or polyalkylene polyamine, and (d) itaconic acid employed in providing the water soluble polyamine polyamide polymer should be:

(b) to (a) — from about 0:1 to about 4:1
(c) to (a) — from about 1:1 to about 3:1
(d) to (a) — from about 1:1 to about 2:1

Preferred mol ratios of the four reactants in obtaining which is refluxed at a temperature of from about 110° to 140°C., preferably from about 120°C. to 136°C., for 60 to 90 minutes to form the additional pyrrolidone groups in the chain. In the case of larger polyalkylene polyamines where $n$ equals 3 or more, the reaction product is added to the itaconic acid, and conversion to the pyrrolidone acid ceases when the amine content is equivalent to the carboxylic acid content, but is only about 50% when $n$ is equal to 4. This further intermediate has the formula:

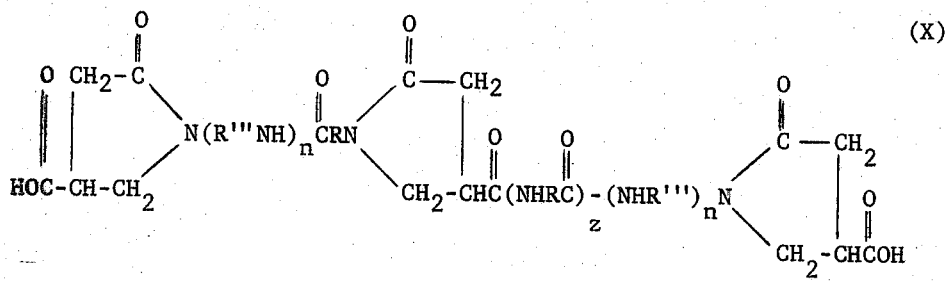

resins of optimum wet strength (uncured and after cure) are (b) to (a) about 1:1, (c) to (a) about 3:1 and (d) to (a) about 2:1.

A preferred process by which the water soluble polyaminepolyamide polymer may be prepared is by heating a mixture of the heterocyclic dicarboxylic acid (I) with the diamine (IV) or polyalkylene polyamine (V) in the presence or absence of the amino carbonyl compound II or III, at 150° to 165°C. for 60 to 90 min- This intermediate product is then reacted with diamine or polyamine to give a polyaminepolyamide polymer which is water soluble. Condensation is effected by raising the temperature to 185°. Those mols of water associated with the formation of the pyrrolidone ring are removed from the reaction site below 150°C. Water associated with polyamide formation is removed above this temperature. The final polymer has the formula:

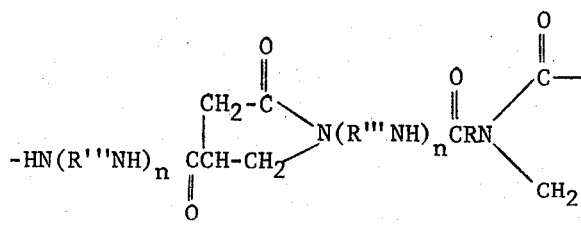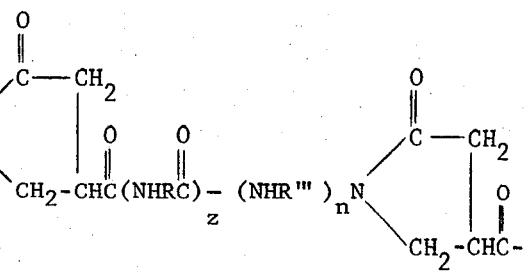

This polymer is diluted to 50% solids content with water.

In order to render the water-soluble polyamine polyamide polymer crosslinkable or thermosetting, the polymer is reacted with epichlorohydrin. In carrying out this reaction, the polymer solution is first further diluted with water to provide a polymer solution containing from about 18 to 25% solids. While maintaining this solution at a temperature of from about 40° to about 60°C., epichlorohydrin is added incrementally, e.g. dropwise. After addition of all the epichlorohydrin, the solution is heated to a temperature of from about 70° to 80°C., until the pH of the system reaches 6.9 and/or a viscosity greater than I on the Gardner Holdt scale is obtained. The reaction mixture is then diluted and acidified with acid to give a final solution containing 10% solids and having a pH of about 5. The Gardner Holdt viscosity is A to B.

Generally, from about 0.5 to about 1.8 mols of epichlorohydrin per secondary amine group should be used in rendering the polymer thermosetting. The preferred amount of epichlorohydrin used for such purpose is about one mol for each secondary amine group.

The cationic thermsetting resins of this invention impart improved wet and dry strength to paper (uncured or cured) whether made under acid, alkaline, or neutral conditions.

The resin preferably is incorporated into paper pulp at any point on the wet end of the paper machine, e.g., at the beater, stock chest, head box, etc. The resin may also be applied to a web of paper as by immersing the web in a solution of the resin, by spraying, etc., followed by heating to cure the resin. For most purposes, adequate wet strength is developed by simply drying the sheet and allowing natural aging to take place.

Adequate wet strength may be obtained by incorporating in the paper from about 0.15% to about 3% of the resin based on the dry weight of the pulp. Higher percentage additions may be made for special purposes.

Paper and pulp slurries having a pH of from 4.5 to 11 may be effectively treated with resins of this invention.

The invention will be illustrated by means of the following examples:

EXAMPLE 1

Into a two liter flask equipped with condenser, thermometer, and stirrer were charged 36 g water, 113 g caprolactam, 131 g 6-aminohexanoic acid, and 130 g of itaconic acid. This mixture was heated at 105°C. for 1 hour and then heated to reflux. The reaction intermediate was cooled and 206 g of diethylenetriamine were added which was then refluxed for one hour. The reaction mixture was again cooled and 273 g of itaconic acid were added, and the mixture held at 105°C. for one hour and then heated to reflux. Cooling was again applied, and 108 g diethylenetriamine were added. The whole was then heated to 188°C. with vacuum applied for one half hour at this temperature. The resin was diluted to 50% solids content, and the Gardner Holdt viscosity was U at 25C. The amine equivalent of the polymer based on secondary amine is 272.3. 78 g of the above product were diluted with 116 ml of water and heated to 50°C. 16.5 g of epichlorohydrin were added dropwise, and the reaction was held at 70C. until the Gardner Holdt viscosity was greater than I. It was then diluted with 343.5 ml of water of 10% solids and acidified to pH 5 with sulfuric acid. The ratio of epichlorohydrin to secondary amine was 1.25 to 1.

EXAMPLE 2

A polyamine polyamide polymer was prepared from 130 g of itaconic acid, 226 g of caprolactam, 36 ml of water, 206 g diethylenetriamine, 263 g of itaconic acid, and 108 g of diethylenetriamine using the procedure of Example 1 except that a three hour reflux period was utilized prior to the first amine addition. The viscosity of the polymer at 50% solids on the Gardner Holdt scale was U. A 10% solution was prepared for testing.

EXAMPLE 3

An 80% softwood and 20% hardwood bleached sulfite was beaten to a Canadian Freeness Value of 450 cc in a Valley beater. The pulp was adjusted to a pH value of 6.8 with sodium carbonate and variable amounts of the resin of Example 2 were applied to the stock (0 to 1%) based on the dry weight of pulp. 43 lb. per eam (TAPPI Standard) sheets were made on the Noble and Wood handsheet machine without a closed white water system. The handsheets were dried 3 minutes at 105°C., and proportions of them were later cured for 1 hour at 105°C.

| | Wet Strength oz/in | |
|---|---|---|
| | Example 2 | |
| % Resin | Dried | Cured |
| 0.0 | 16.3 | 16.4 |
| 0.2 | 31.3 | 48.3 |
| 0.5 | 53.2 | 79.4 |
| 1.0 | 66.7 | 108.7 |

| | Dry Strength oz/in | |
|---|---|---|
| | Example 2 | |
| % Resin | Dried | Cured |
| 0.0 | 359 | 378 |
| 0.2 | 385 | 414 |
| 0.5 | 407 | 423 |
| 1.0 | 395 | 435 |

The dry strengths show an improvement over the sample containing no resin.

EXAMPLE 4

Paper was again prepared as in Example 3, and resins were applied at 0.75% solids based on the dry weight of the pulp.

| Example No. | Wet Strength oz/in | | Dry Strength oz/in | |
|---|---|---|---|---|
| | Dried | Cured | Dried | Cured |
| Blank | 16.3 | 16.4 | 359 | 379 |
| 1 | 56.8 | 93.0 | 371 | 440 |
| 2 | 61.0 | 92.8 | 390 | 440 |

What is claimed is:

1. A cationic thermosetting resin prepared by heating at a temperature of from about 150° to about 165°C. a mixture of:

a. a heterocyclic dicarboxylic acid of the formula:

$$HOOC-R-N \begin{array}{c} C(=O)-CH_2 \\ | \\ CH_2-CH-COOH \end{array}$$

where R is an alkylene radical containing form 1 to 10 carbon atoms or an arylene radical, and for each mol of dicarboxylic acid, b. an amino carbonyl compound which is an amino acid of the formula $H_2N-R'-COOH$ or a lactam of the formula:

$$\begin{array}{c} O \\ \| \\ C \\ / \quad | \\ R'' \quad | \\ \backslash \\ NH \end{array}$$

where R' is an alkylene radical containing from 1 to 10 carbon atoms or an arylene radical, and R'' is an alkylene radical containing from 3 to 10 carbon atoms;

c. a portion of the total amount of an amine which is a diamine of the formula $H_2N-R'''-NH_2$ or a polyalkylene-polyamine of the formula $H_2N-(R^{ir}-NH)_n-H$ where R''' and $R^{ir}$ are alkylene groups containing from 2 to 6 carbon atoms, and $n$ is an integer from 1 to 5; cooling the resulting first intermediate reaction product VIII, combining d. itaconic acid with said first intermediate reaction product in an amount so as to provide an excess of itaconic acid with respect to carbonyl groups to amine groups of said first intermediate and heating the mixture to a temperature of from about 110° to about 140°C. under reflux to obtain a second intermediate reaction product X, adding a further quantity of reactant (c) to said second intermediate reaction product and effecting condensation and removal of water by heating the mixture to a temperature of about 185°C., to form a water-soluble polyamide polyamine polumer XI, the proportions of reactants employed being from 0 to 4 mols of reactant (b), 1 to 3 mols of reactant (c) and 1 to 2 mols of reactant (d) for each mol of reactant (a), diluting said polyamine polyamide polymer with water to provide a solution containing from about 18 to about 25% by weight of polymer, adding to said polymer solution from about .05 to about 1.8 mols of epichlorohydrin per secondary amine group in said polymer while maintaining the temperature of said polymer solution at from about 40° to about 60°C., and thereafter heating said polymer solution to a temperature of from about 70° to about 80°C. to provide a cationic thermosetting resin.

2. A cationic thermosetting resin according to claim 1 in which 1 mol of reactant (b), 3 mols of reactant (c) and 2 mols of reactant (d) for each mol of reactant (a) are used, and sufficient epichlorohydrin to convert all of the secondary amine groups of said polymer to tertiary amine groups is used.

3. A cationic thermosetting resin according to claim 2 in which the heterocyclic dicarboxylic acid reactant (a) is formed by reacting itaconic acid and an amino carbonyl compound which is caprolactam, 6-aminohexanoic acid, and mixtures thereof.

4. A cationic thermosetting resin according to claim 3 in which reactant (a) is 1- carboxypentyl - 4-carboxypyrrolidone, reactant (b) is caprolactam, and reactant (c) is diethylenetriamine.

5. A process for producing a water soluble polyamine polyamide polymer which comprises heating at a temperature from about 150° to about 165°C. a mixture of:

a. a heterocyclic dicarboxylic acid of the formula:

$$HOOC-R-N \begin{array}{c} C(=O)-CH_2 \\ | \\ CH_2-CH-COOH \end{array}$$

where R is an alkylene radical containing form 1 to 10 carbon atoms, or an arylene radical;

b. an amino carbonyl compound which is an amino acid of the formula $H_2N-R'-COOH$ or a lactam of the formula:

$$\begin{array}{c} O \\ \| \\ C \\ / \quad | \\ R'' \quad | \\ \backslash \\ NH \end{array}$$

where R' is an alkylene radical containing form 1 to 10 carbon atoms or an arylene radical, and R'' is an alkylene radical containing from 3 to 10 carbon atoms; and c. a portion of total amine which is a diamine of the formula $H_2N-R'''-NH_2$ or a polyalkyleneopolyamine of the formula $H_2N-(R^{ir}-NH)_n-H$ where R''' and $R^{ir}$ are alkylene groups containing from 2 to 6 carbon atoms, and $n$ is an integer from 1 to 5; cooling the resulting first intermediate reaction product VIII, combining d. itaconic acid with said first intermediate reaction product in an amount so as to provide an excess of itaconic acid with respect to carbonyl groups to amine groups of said first intermediate and heating the mixture to a temperature of from about 110° to about 140°C. under reflux to obtain a second intermediate reaction product X, adding a further quantity of reactant (c) to said second intermediate reaction product and effecting condensation and removal of water by heating the mixture to a temperature of about 185°C., to obtain a water-soluble polyamine polyamide polymer XI, the proportions of reactants employed being from 0 to 4 mols of reactant (b), 1 to 3 mols of reactant (c) and 1 to 2 mols of reactant (d) for each mol of reactant (a), diluting said polyamine polyamide polymer with water to provide a solution containing from about 18 to about 25% by weight of polymer, adding to said polymer solution from about 0.5 to about 1.8 mols of epichlorohydrin per secondary amine group in said polymer while maintaining the temperature thereof at from about 40° to about 60°C., and thereafter heating said solution to a temperature of from 70° to about 80°C. to provide a cationic thermosetting resin.

6. The process according to claim 5 in which 1 mol of reactant (b), 3 mols of reactant (c) and 2 mols of reactant (d) for each mol of reactant (a) are used.

7. The process according to claim 6 wherein 6-aminohexanoic acid and itaconic acid are first reacted to form as reactant (a) 1- carboxypentyl- 4-carboxypyrrolidone, reactant (b) is caprolactam and reactant (c) is diethylenetriamine.

8. The process according to claim 7 in which said polyamine polyamide polymer is diluted with water to provide a soltion containing from about 18 to about 25% by weight of polymer, from about 0.5 to about 1.8 mols of epichlorohydrin per secondary amine group in said polymer are added to said polymer solution while the temperature thereof is maintained at from about 40° to about 60°C., and said solution is thereafter heated to a temperature of from 70° to about 80°C. to provide a cationic thermosetting resin.

9. An improved wet strength paper comprising a web of paper-making fibers and from about 0.15% to about 3.0% based on weight of dry fibers, of the cationic theremosetting resin of claim 1.

10. An improved wet strength paper comprising a web of paper-making fibers and from about 0.15% to about 3.0% based on weight of dry fibers, of the cationic thermosetting resin of claim 4.

* * * * *

UNITED STATES PATENT OFFICE
CERTIFICATE OF CORRECTION

Patent No. 3,869,343     Dated March 4, 1975

Inventor(s) Francis S. Munjat and Samuel Ho Kim

It is certified that error appears in the above-identified patent and that said Letters Patent are hereby corrected as shown below:

Column 5, line 16, "is" should read --in--.

Column 8, line 29, "263" should read --273--.

Column 9, line 59, "polumer" should read --polymer--.

Column 9, line 66, ".05" should read --0.5--.

Signed and Sealed this twenty-eight Day of October 1975

[SEAL]

Attest:

RUTH C. MASON
Attesting Officer

C. MARSHALL DANN
Commissioner of Patents and Trademarks